(12) United States Patent
Kim et al.

(10) Patent No.: US 9,250,756 B2
(45) Date of Patent: Feb. 2, 2016

(54) TOUCH SENSOR INTEGRATED TYPE DISPLAY DEVICE COMPRISING A PLURALITY OF FIRST AND SECOND ELECTRODES

(71) Applicant: LG Display Co., Ltd., Seoul (KR)

(72) Inventors: Jinseong Kim, Jeollabuk-do (KR); Juhan Kim, Gyeonggi-do (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 22 days.

(21) Appl. No.: 14/097,409

(22) Filed: Dec. 5, 2013

(65) Prior Publication Data
US 2014/0168538 A1 Jun. 19, 2014

(30) Foreign Application Priority Data
Dec. 13, 2012 (KR) .................. 10-2012-0145341

(51) Int. Cl.
G02F 1/1335 (2006.01)
G06F 3/041 (2006.01)
G06F 3/044 (2006.01)

(52) U.S. Cl.
CPC ............. G06F 3/044 (2013.01); G06F 3/0412 (2013.01)

(58) Field of Classification Search
USPC .................. 349/1, 12; 345/175–178
See application file for complete search history.

(56) References Cited

U.S. PATENT DOCUMENTS

2009/0231497 A1* 9/2009 Takahashi et al. ............... 349/1
2011/0228189 A1* 9/2011 Oh et al. .......................... 349/43

* cited by examiner

Primary Examiner — Paul Lee
(74) Attorney, Agent, or Firm — Morgan, Lewis & Bockius LLP (57) ABSTRACT

A touch sensor integrated type display device includes gate lines, a gate insulating film, data lines formed to cross over the gate lines, thin film transistors formed in pixel regions, a first passivation layer that covers the thin film transistors, first electrodes disposed on the first passivation layer along the data lines with the gate lines interposed therebetween, a second passivation layer covering the first electrodes, pixel electrodes that are formed in the pixel regions to partially overlap the first electrodes, and second electrodes formed on the second passivation layer in parallel with the gate lines, each of the plurality of second electrodes is disposed between neighboring pixel electrodes with the gate lines interposed therebetween.

11 Claims, 4 Drawing Sheets

TOUCH SENSOR INTEGRATED TYPE DISPLAY DEVICE COMPRISING A PLURALITY OF FIRST AND SECOND ELECTRODES

This application claims the benefit of priority under 35 U.S.C. §119(a) to Korean Patent Application No. 10-2012-0145341 filed on Dec. 13, 2012, the entire content of which is incorporated herein by reference herein in its entirety.

BACKGROUND

1. Field

This document relates to a touch sensor integrated type display device capable of recognizing a user's touch, and more particularly, to a touch sensor integrated type display device which is capable of increasing the sensitivity of a touch sensor by reducing the amount of change in electrostatic capacitance caused by a touch driving electrode.

2. Related Art

Various input devices, such as a keyboard, a mouse, a trackball, a joystick, a digitizer, and the like, are used to configure an interface between a user and home appliances or various information communication devices. However, the use of the above input devices requires the user to learn how to use them and involves inconvenience like the space occupied by them. Accordingly, there is a growing demand for input devices which are easy and simple to use and can reduce malfunctions. In response to this demand, a touch sensor was proposed to enable the user to directly touch the screen with their finger or a pen to input information.

The touch sensor is simple to use, has less malfunctions, and enables the user to input without using an additional input device. In addition, the touch sensor can be applied to various display devices because it enables the user to operate it quickly and easily through content displayed on the screen.

Touch sensors can be classified into add-on type and on-cell type. In the add-on type, a display device and a touch panel having a touch sensor are separately manufactured, and the touch panel is attached onto an upper substrate of the display device. In the on-cell type, a touch sensor is directly formed on the surface of an upper glass substrate of a display device.

However, the add-on type sensor has a structure in which the completed touch panel is mounted on the display device and has various problems, such as increased thickness or reduced visibility due to low brightness of the display device.

In addition, the on-cell type touch sensor has a structure in which a touch panel is formed on the upper surface of the display device and can have a reduced thickness compared to the add-on type but still has the problem of the increase in entire thickness due to a driving electrode layer, a sensing electrode layer, and an insulation layer for insulating the driving electrode layer and the sensing electrode layer which constitute the touch sensor.

Accordingly, the need for a display device capable of solving the related art problems has arisen.

SUMMARY

The present invention has been made in an effort to provide a touch sensor integrated type display device which can have a reduced thickness and increase touch sensitivity by allowing some elements of the display device to also serve as touch driving electrodes and touch sensing electrodes for recognizing a touch on the display device.

The present invention has been made in another effort to provide a touch sensor integrated type display device which is capable of preventing a reduction in touch sensitivity and an increase in parasitic electrostatic capacitance by reducing the electrostatic capacitance between touch driving electrodes and touch sensing electrodes.

To achieve these and other advantages and in accordance with the purpose of this invention, as embodied and broadly described, a touch sensor integrated type display device having a thin film transistor array with a first substrate and a color filter array with a second substrate, includes. a plurality of gate lines formed in parallel on the first substrate; a gate insulating film covering the gate lines; a plurality of data lines formed on the gate insulating film to cross over the gate lines; a plurality of thin film transistors formed in a plurality of pixel regions defined by crossings of the gate lines and the data lines; a first passivation layer that covers the thin film transistors and exposes a portion of the gate insulating film; a plurality of first electrodes disposed on the first passivation layer along the data lines with the gate lines interposed therebetween, each of the plurality of first electrodes being disposed in pixel regions defined by the crossings of the gate lines and the data lines; a second passivation layer covering the plurality of first electrodes; a plurality of pixel electrodes that are respectively formed in the plurality of pixel regions on the second passivation layer and at least partially overlap the first electrodes; and a plurality of second electrodes that are formed on the second passivation layer in parallel with the gate lines, each of the plurality of second electrodes is disposed between neighboring pixel electrodes with the gate lines interposed therebetween.

The touch sensor integrated type display device further includes a black matrix and color filters formed on the second substrate and a column spacer that is formed on the black matrix and maintains a cell gap between the thin film transistor array and the color filter array.

Each of the plurality of second electrodes overlaps the black matrix and the column spacer.

The column spacer includes a first portion comprising an area corresponding to a first electrode formation area; and a second portion that protrudes partially from the first portion and maintains the cell gap between the thin film transistor array and the color filter array.

To achieve these and other advantages and in accordance with the purpose of this invention, as embodied and broadly described, a touch sensor integrated type display device having a thin film transistor array with a first substrate and a color filter array with a second substrate, includes a plurality of gate lines formed in parallel on the first substrate; a gate insulating film covering the gate lines; a plurality of data lines formed on the gate insulating film to cross over the gate lines; a plurality of thin film transistors formed in a plurality of pixel regions defined by the crossings of the gate lines and the data lines; a first passivation layer that covers the gate insulating film where the thin film transistors are formed; a plurality of first electrodes that are formed in parallel with the data lines in at least two pixel regions, each of the plurality of first electrodes is disposed with the gate line interposed between the at least two pixel regions; a second passivation layer covering the plurality of first electrodes; a plurality of pixel electrodes that are formed in the plurality of pixel regions on the second passivation layer and at least partially overlap the first electrodes; a plurality of second electrodes that are formed on the second passivation layer and arranged in parallel with the gate lines; a black matrix and color filters formed on the second substrate; and a column spacer comprising a first portion having an area corresponding to a first electrode formation area and a second portion that protrudes partially from the first portion and maintains the cell gap between the thin film transistor array and the color filter array.

The second portion of the column spacer faces portions of the first electrodes.

According to a touch sensor integrated type display device in accordance with an aspect of the present invention, there is no need to form separate touch driving electrodes or touch sensing electrodes because common electrodes used to form an electric field for driving liquid crystals of the display device together with pixel electrodes can be used as touch driving electrodes or touch sensing electrodes. Accordingly, the number of processes required to form the touch driving electrodes or touch sensing electrodes can be reduced, and the display device can be made thinner by the thickness of the touch driving electrodes or touch sensing electrodes.

According to a touch sensor integrated type display device in accordance with a first aspect of the present invention, common electrodes COM also serving as touch driving electrodes can be formed on a gate insulating film GI, and a first passivation layer PAS1 can shield an electric field between the common electrodes and touch sensing electrodes. Consequently, the amount of liquid crystals between the black matrix of a color filter array and the touch sensing electrodes of a thin film transistor array can be reduced, and this can decrease the amount of change in electrostatic capacitance due to the reduction in the amount of liquid crystals.

According to a touch sensor integrated type display device in accordance with a second aspect of the present invention, first and second portions of a column spacer of a color filter array can reduce the amount of liquid crystals filled between the first portion of the column spacer of the color filter array and touch sensing electrodes of a thin film transistor array, and this reduction in the amount of liquid crystals can decrease the amount of change in electrostatic capacitance.

BRIEF DESCRIPTION OF THE DRAWINGS

The teachings of the embodiments can be readily understood by considering the following detailed description in conjunction with the accompanying drawings.

DETAILED DESCRIPTION

Hereinafter, exemplary embodiments of the present invention will be described in detail with reference to the attached drawings. Throughout the specification, the same reference numerals indicate substantially the same components. In the following description, a touch sensor integrated type liquid crystal display device will be described in full detail as an example of a touch sensor integrated type display device.

Figure 1:
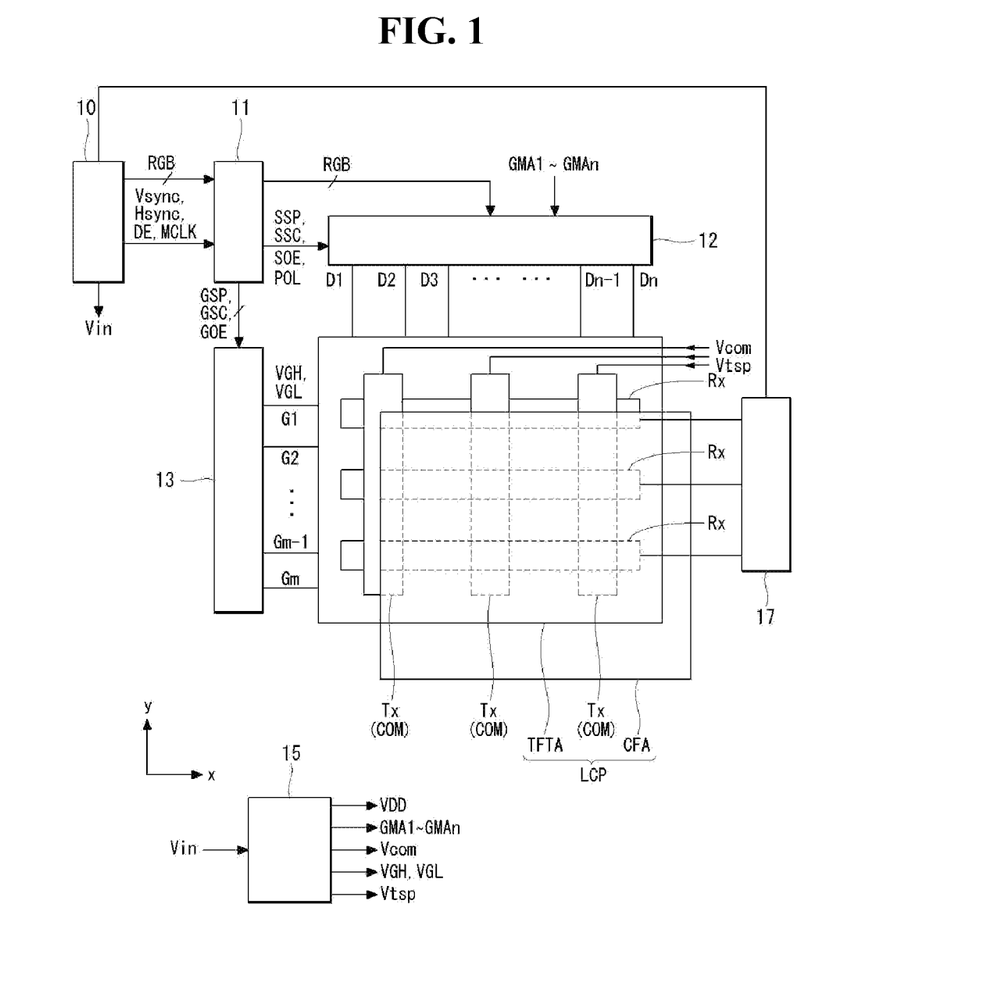
FIG. 1 is a block diagram schematically showing a touch sensor integrated type display device according to an exemplary embodiment of the present invention.
Figure 2:
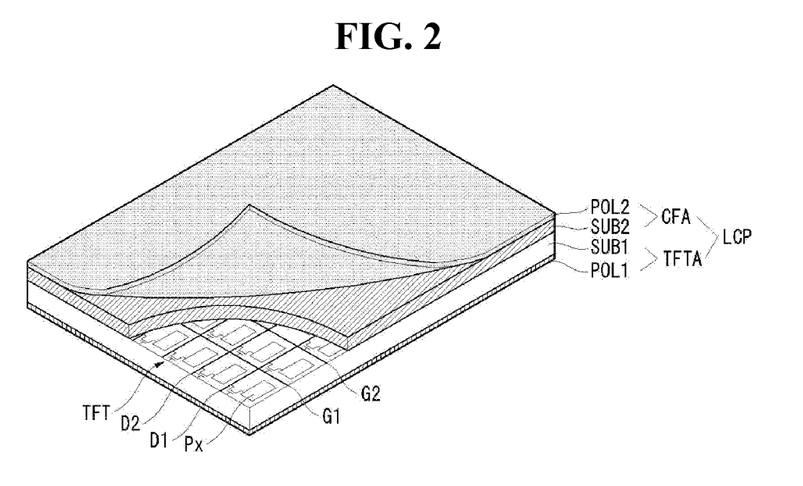
FIG. 2 is a partial exploded perspective view schematically showing the display device of FIG. 1.

Firstly, a touch sensor integrated type display device according to a first exemplary embodiment of the present invention will be described with reference to FIGS. 1 and 2. FIG. 1 is a block diagram schematically showing a touch sensor integrated type display device according to an exemplary embodiment of the present invention. FIG. 2 is a partial exploded perspective view schematically showing the display device of FIG. 1

Referring to FIG. 1, the touch sensor integrated type liquid crystal display device according to a first exemplary embodiment of the present invention includes a liquid crystal display panel LCP, a host controller 10, a timing controller 11, a data driver 12, a gate driver 13, a power supply unit 15, and a touch recognition processor 17.

The liquid crystal display panel LCP includes a color filter array CFA and a thin film transistor array TFTA, with a liquid crystal layer (not shown) interposed between them.

Referring to FIGS. 1 and 2, the thin film transistor array TFTA includes a plurality of gate lines G1, G2, . . . , GM formed in parallel on a first substrate SUB1 in a first direction (e.g., x direction), a plurality of data lines D1, D2, . . . , Dn formed in parallel in a second direction (e.g., y direction) so as to cross over the plurality of data lines G1, G2, . . . , Gm, thin film transistors TFT formed at the crossings of the gate lines G1, G2, . . . , Gm and the data lines D1, D2, . . . , Dn, a plurality of pixel electrodes Px for charging a data voltage in liquid crystal cells, common electrodes COM also serving as touch driving electrodes Tx disposed to face the plurality of pixel electrodes Px, and touch sensing electrodes Rx.

The common electrodes COM are formed on a second substrate SUB2 in a vertical electric filed type driving method such as a twisted nematic (TN) mode and a vertical alignment (VA) mode. Alternatively, the common electrodes COM may be formed on the first substrate SUB1 together with the pixel electrodes Px in a horizontal electric field type driving method such as an in-plane switching (IPS) mode and a fringe field switching (FFS) mode. The exemplary embodiment of the present invention will be described below with respect to the horizontal electric field driving method.

The common electrodes COM also serve as touch driving electrodes. Accordingly, the common electrodes COM are referred to as touch driving electrodes Tx, touch driving electrodes Tx also serving as common electrodes, or common electrodes COM also serving as touch driving electrodes, as necessary. Although the exemplary embodiment of the present invention is described with respect to the common electrodes COM also serving as the touch driving electrodes Tx, the present invention is not limited thereto. The common electrodes may be configured to also serve as the touch sensing electrodes. In this case, the touch sensing electrodes according to the exemplary embodiment of the present invention become the touch driving electrodes.

The common electrodes COM of the touch sensor integrated type display device according to the exemplary embodiment of the present invention include a plurality of common electrodes that are divided in parallel in a first direction (e.g., x-axis direction) or second direction (e.g., y-axis direction) (arranged in the x-axis direction and divided in the y-axis direction in the exemplary embodiment of the present invention). The common electrodes COM also serve as a plurality of touch sensing electrodes Rx constituting the touch sensor.

The plurality of touch driving electrodes Tx of the thin film transistor array TFTA are divided in parallel in the first direction (e.g. x-axis direction) crossing the touch sensing electrodes Rx.

Figure 3:
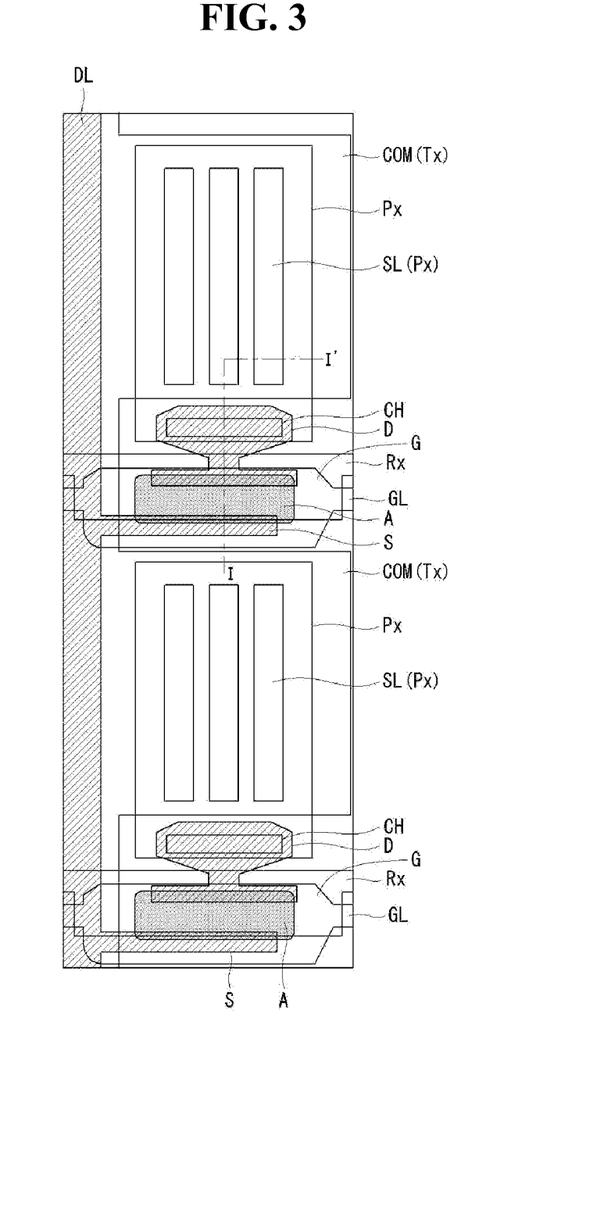
FIG. 3 is a top plan view showing part of thin film transistors of the touch sensor integrated type display device according to a first exemplary embodiment of the present invention.
Figure 4:
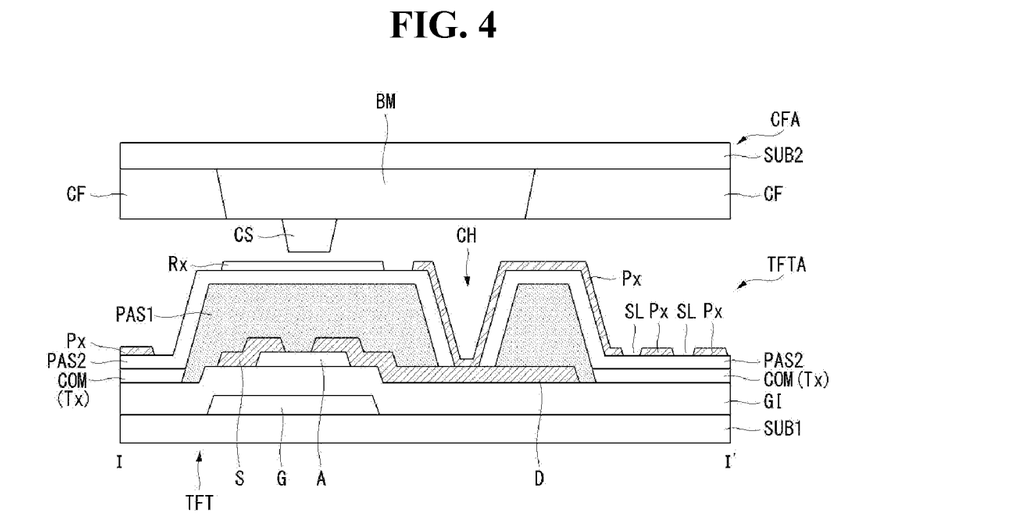
FIG. 4 is a cross-sectional view showing a color filter array and thin film transistor array of the touch sensor integrated type display device according to the first exemplary embodiment of the present invention.

Referring to FIGS. 3 and 4, the thin film transistor array TFTA according to a first exemplary embodiment of the present invention will be described in more detail below. FIG. 3 is a top plan view showing part of thin film transistors of the touch sensor integrated type display device according to a first exemplary embodiment of the present invention. FIG. 4 is a cross-sectional view showing a color filter array and thin film transistor array of the touch sensor integrated type display device according to the first exemplary embodiment of the present invention.

Referring to FIGS. 3 and 4, the touch sensor integrated type display device according to the first exemplary embodiment of the present invention includes a color filter array CFA and a thin film transistor array TFTA.

The thin film transistor array TFTA includes gate lines GL and data lines DL formed on a first substrate SUB1 to cross over each other, thin film transistors TFT formed at the crossings of the gate lines GL and the data lines DL, pixel electrodes Px formed in regions defined by the crossings of the gate lines GL and the data lines DL, touch sensing electrodes Rx formed between neighboring pixel electrodes Px, with the gate lines GL interposed between them, and common electrodes COM also serving as touch driving electrodes facing the pixel electrodes Px.

Each thin film transistor TFT includes a gate electrode G formed on the first substrate SUB1 and extending from a gate line GL, an active layer A formed corresponding to the gate electrode G on a gate insulating layer GI covering the gate line GL and the gate electrode G, a source electrode S that is formed on a first passivation layer PAS1 covering the active layer A and extends from a data line DL, and a drain electrode D facing the source electrode S. The thus-formed thin film transistor TFT is covered with a first passivation layer PAS1, and part of the drain electrode D of the thin film transistor TFT is exposed through a contact hole CH formed in the first passivation layer PAS1. The first passivation layer PAS1 is formed to expose the gate insulating film GI except in the region where the thin film transistor is formed.

A plurality of common electrodes COM also serving as the touch driving electrodes Tx form a line in the y-axis direction on the first passivation layer PAS1 covering the thin film transistors TFT and the gate insulating film GI and on the gate insulating film GI.

A second passivation layer PAS2 is formed on the entire surface of the first substrate SUB1 where the touch driving electrodes Tx are formed, and contact holes CH penetrating the first passivation layer PAS1 and the second passivation layer PAS2 are formed to expose part of the drain electrodes D.

Pixel electrodes Px and touch sensing electrodes Rx are formed on the second passivation layer PAS2 with the contact holes CH. The pixel electrodes Px are formed in regions defined by the crossings of the gate lines GL and the data lines DL, and connected to the drain electrodes D. The touch sensing electrodes Rx are formed on the second passivation layer PAS2, and are also formed between the pixel electrodes Px neighboring each other with the gate lines GL interposed therebetween.

In the touch sensor integrated type display device according to the first exemplary embodiment of the present invention, as shown in FIGS. 3 and 4, the touch driving electrodes Tx formed on the first passivation layer PAS1 have no slits, and the pixel electrodes Px formed on the second passivation layer PAS2 have no slits SL.

The color filter array CFA includes a black matrix BM and color filters that formed on the second substrate SUB2. The color filter array CFA further includes a column spacer CS for maintaining a cell gap of liquid crystal cells between the thin film transistor array TFTA and the color filter array CFA.

Polarizers POL1 and POL2 are respectively attached to the outer surface of the first substrate SUB1 of the thin film transistor array TFTA and the outer surface of the second substrate SUB2 of the color filter array CFA. An alignment film (not shown) for setting a pretilt angle of liquid crystals is formed on the inner surfaces of the first and second substrates SUB1 and SUB2 contacting the liquid crystals.

Figure 5:
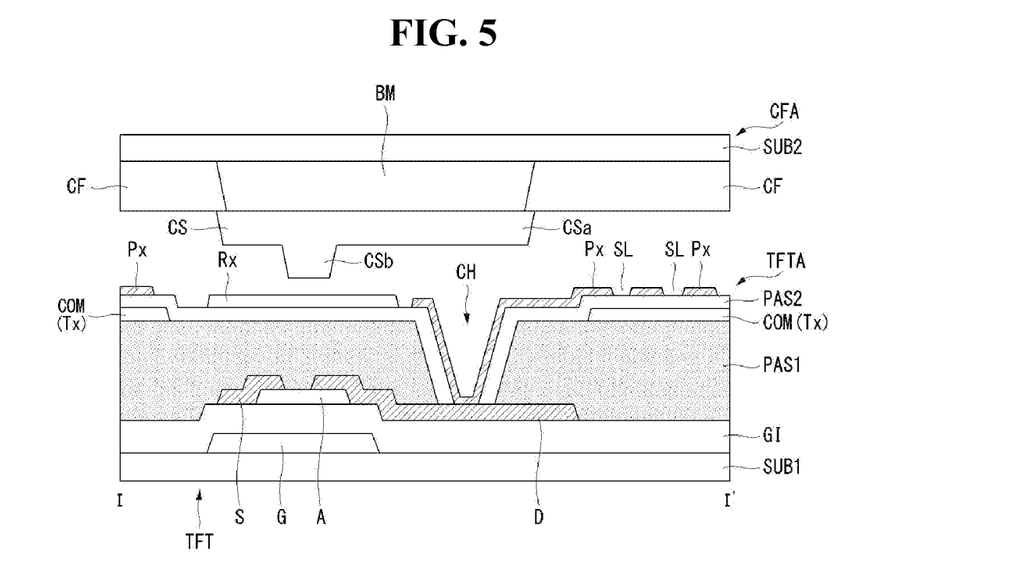
FIG. 5 is a cross-sectional view showing a color filter array and thin film transistor array of a touch sensor integrated type display device according to a second exemplary embodiment of the present invention.

Next, a touch sensor integrated type display device according to a second exemplary embodiment of the present invention will now be described with reference to FIG. 5. FIG. 5 is a cross-sectional view showing a color filter array and thin film transistor array of a touch sensor integrated type display device according to a second exemplary embodiment of the present invention.

The touch sensor integrated type display device according to the second exemplary embodiment of the present invention is identical to that of the first exemplary embodiment of the present invention except that an electric field shielding insulating pattern according to the first exemplary embodiment of the present invention is not formed on the thin film transistors but a column spacer of the color filter array has a stepped portion corresponding to the position of a sensing electrode of the thin film transistor array so that the amount of liquid crystals filled between them can be reduced. Accordingly, the top plan view of FIG. 3 according to the first exemplary embodiment of the present invention will be partly used to explain the second exemplary embodiment since it is also applicable to the second exemplary embodiment of the present invention.

Referring to FIGS. 3 and 5, the thin film transistor array TFTA of the display device includes gate lines GL and data lines DL formed on a first substrate SUB1 to cross over each other, thin film transistors TFT formed at the crossings of the gate lines GL and the data lines DL, pixel electrodes Px formed in regions defined by the crossings of the gate lines GL and the data lines DL, touch sensing electrodes Rx formed between neighboring pixel electrodes Px, with the gate lines GL interposed between them, and common electrodes COM facing the pixel electrodes Px.

Each thin film transistor TFT includes a gate electrode G formed on the first substrate SUB1 and extending from a gate line GL, an active layer A formed corresponding to the gate electrode G on a gate insulating layer GI covering the gate line GL and the gate electrode G, a source electrode S that is formed on a first passivation layer PAS1 covering the active layer A and extends from a data line DL, and a drain electrode D facing the source electrode S. The thus-formed thin film transistor TFT is covered with a first passivation layer PAS1, and part of the drain electrode D of the thin film transistor TFT is exposed through a contact hole CH formed in the first passivation layer PAS1.

A plurality of common electrodes COM also serving as the touch driving electrodes Tx form a line in the y-axis direction on the first passivation layer PAS1 covering the thin film transistors TFT and the gate insulating film GI.

A second passivation layer PAS2 is formed on the entire surface of the first substrate SUB1 where the touch driving electrodes Tx are formed, and contact holes CH penetrating the first passivation layer PAS1 and the second passivation layer PAS2 are formed to expose part of the drain electrodes D.

Pixel electrodes Px are formed on the second passivation layer PAS2 with the contact holes CH. The pixel electrodes Px are formed in regions defined by the crossings of the gate lines GL and the data lines DL, and connected to the drain electrodes D.

In the touch sensor integrated type display device according to the second exemplary embodiment of the present invention, as shown in FIGS. 3 and 5, the touch driving electrodes Tx formed on the first passivation layer PAS1 have no slits, and the pixel electrodes Px formed on the second passivation layer PAS2 have slits SL.

The color filter array CFA includes a black matrix BM and color filters that formed on the second substrate SUB2. The color filter array CFA further includes a column spacer CS for maintaining a cell gap of liquid crystal cells between the thin film transistor array TFTA and the color filter array CFA.

The column spacer CS according to the second exemplary embodiment of the present invention is formed on the black matrix BM, and has a first portion CSa and a second portion CSb protruding partially from the first portion CSa. The first portion CSa of the column spacer CS corresponds to the position where the touch sensing electrodes Rx and the contact holes CH are formed, and the second portion CSb corresponds to part of the touch sensing electrodes Rx, thus maintaining the cell gap between the thin film transistor array TFTA and the color filter array CFA.

Polarizers POL1 and POL2 are respectively attached to the outer surfaces of the first and second substrates SUB1 and SUB2 of the liquid crystal panel LCP. An alignment film (not shown) for setting a pretilt angle of liquid crystal is formed on the inner surfaces of the first and second substrates SUB1 and SUB2 contacting the liquid crystal.

Referring again to FIG. 1, the gate driver 13 sequentially outputs gate pulses (or scan pulses) in a display mode under the control of the timing controller 11, and shifts the swing voltage of the output to a gate high voltage VGH and a gate low voltage VGL. The gate pulses output from the gate driver 13 are sequentially supplied to the gate lines G1 to Gm in synchronization with a data voltage output from the data driver 12. The gate high voltage VGH is a voltage higher than the threshold voltage of the thin film transistors TFT, and the gate low voltage VGL is a voltage lower than the threshold voltage of the thin film transistors TFT. Gate driving ICs (integrated circuits) may be connected to the gate lines G1 to Gm formed on the first substrate SUB1 of the thin film transistor array TFTA through a TAP (Tape Automated Bonding) process, or formed directly on the first substrate SUB1 of the thin film transistor array TFTA together with the pixels through a GIP (Gate In Panel) process.

The data driver 12 samples and latches digital video data RGB under the control of the timing controller 11. The data driver 12 outputs positive/negative data voltages by inverting the polarity of a data voltage of digital video data RGB based on positive/negative gamma compensation voltages GMA1 to GMAn supplied from the power supply unit 15. The positive/negative data voltages output from the data driver 12 are synchronized with the gate pulses output from the gate driver 13. Source driving ICs of the data driver 12 may be connected to the data lines D1 to Dn of a display unit through a chip-on glass (COG) process or the TAB process. The source driving ICs may be integrated inside the timing controller 11 and thus may be implemented as a single chip IC along with the timing controller 11.

The timing controller 11 generates timing control signals for controlling operation timings of the gate driver 13 and the data driver 12 by using timing signals, which are supplied from an external host controller 10 and required to drive the display device. The timing control signals for controlling operation timings of the gate driver 13 and data driver 12 include a gate timing control signal for controlling the operation timing of the gate driver 10 and a data timing control signal for controlling the operation timing of the data driver 12 and the polarity of the data voltage.

The gate timing control signal includes a gate start pulse GSP, a gate shift clock GSC, a gate output enable GOE, and the like. The gate start pulse GSP is applied to a first gate driving IC of the gate driver 13 to output the first gate pulse in each frame period, and controls a shift start timing of the first gate driving IC. The gate shift clock GSC is commonly input to the gate driving ICs of the gate driver 13 and shifts the gate start pulse GSP. The gate output enable GOE controls output timings of the gate driving ICs of the gate driver 13.

The data timing control signal includes a source start pulse SSP, a source sampling clock SSC, a polarity control signal POL, a source output enable SOE, and the like. The source start pulse SSP is applied to a first source driving IC of the data driver 12 to sample the first data and controls a data sampling start timing. The source sampling clock SSC controls a sampling timing of data inside the source driving ICs based on a rising or falling edge thereof. The polarity control signal POL controls the polarity of the data voltage output from the source driving ICs. The source output enable SOE controls output timings of the source driving ICs. If the digital video data RGB is input to the data driver 12 through a mini low voltage differential signaling (LVDS) interface, the source start pulse SSP and the source sampling clock SSC may be omitted.

The power supply unit 15 is implemented as a DC-DC converter comprising a pulse width modulation (PWM) circuit, a boost converter, a regulator, a charge pump, a voltage divider, an operational amplifier, etc. The power supply unit 15 regulates a voltage input from the host controller and generates voltages required to drive the liquid crystal display panel LCP, the data driver 12, the gate driver 13, the timing controller 11, and the backlight unit (not shown).

The voltages generated by the power supply unit 15 include a high potential power voltage VDD, the gate high voltage VGH, the gate low voltage VGL, a common voltage Vcom, positive and negative gamma reference voltages VGMA1 to VGMAn, a touch driving voltage Vtsp, and the like. Among these voltages, the common voltage Vcom is supplied to the common electrodes COM under the control of the host controller 10 during a display driving operation. Alternatively, the common voltage Vcom may be supplied to all the common electrodes COM under the control of the timing controller 11. Meanwhile, the touch driving voltage Vtsp is supplied to the touch driving electrodes Tx under the control of the host controller 10 during a touch driving operation. Alternatively, the touch driving voltage Vtsp may be supplied to the touch driving electrodes Tx under the control of the timing controller 11. Although the exemplary embodiment of the present invention illustrates that the touch driving voltage Vtsp is supplied to the touch driving electrodes Tx through the power supply unit 15, the present invention is not limited thereto. For example, the touch driving voltage Vtsp may be supplied to the touch driving electrodes Tx through the touch recognition processor 17, which is controlled by the host controller 10 or the timing controller 11.

The host controller 10 transfers the digital video data RGB of an input image and the timing signals Vsync, Hsync, DE, and MCLK required for a display driving operation to the timing controller 11 through an interface, such as a low voltage difference signaling (LVDS) interface and a transition minimized differential signaling (TMDS) interface. During the display driving operation for displaying an image on the screen of the liquid crystal display device, the host controller 10 supplies a control signal Vin to the power supply unit 15 so as to supply the same common voltage Vcom to the plurality of divided common electrodes COM. During the touch driving operation for touch recognition, a control signal Vin is supplied to the power supply unit 15 so as to supply the touch driving voltage Vtsp to the touch driving electrodes Tx.

The touch recognition processor 17 differentially amplifies a voltage of initial electrostatic capacitance of each of the touch sensing electrodes Rx before a touch event and a voltage of touch electrostatic capacitance thereof after a touch event and converts the result into digital data. The touch recognition processor 17 then detects a touch position based on a difference between the initial electrostatic capacitance and touch electrostatic capacitance of each of the touch sensing electrodes Rx by using a touch recognition algorithm, and outputs touch coordinate data indicating the touch position to the host controller 10.

As described above in detail regarding the touch sensor integrated type display device, a touch sensor and a display device are integrally formed, so a common voltage is supplied to the common electrodes for a display driving operation. This common voltage generates a change in electric field between the touch driving electrodes and the touch sensing electrodes. Moreover, liquid crystals filled between the color filter array CFA and the thin film transistor array TFTA are moved (rotated) due to the change in electric field, thereby causing a change in electrostatic capacitance between the touch driving electrodes and the touch sensing electrodes. Hereupon, when a touch driving voltage is applied to the touch driving electrodes, an electrostatic capacitance between the touch driving electrodes and the touch sensing electrodes is detected, and therefore a touch operation is recognized even through no touch operation occurs.

According to the touch sensor integrated type display device in accordance with the first exemplary embodiment of the present invention, common electrodes COM also serving as touch driving electrodes can be formed on a gate insulating film GI, and a first passivation layer PAS1 can shield an electric field between the common electrodes and touch sensing electrodes. Consequently, the amount of liquid crystals between the black matrix BM of a color filter array CFA and the touch sensing electrodes of a thin film transistor array TFTA can be reduced, and this can decrease the amount of change in electrostatic capacitance due to the reduction in the amount of liquid crystals.

Furthermore, the above-described electric field shielding effect can reduce the movement of liquid crystals, and therefore decrease the amount of change in electrostatic capacitance.

According to the touch sensor integrated type display device in accordance with the second exemplary embodiment of the present invention, a column spacer of a color filter array CFA has a first portion and a second portion, and the first portion corresponds to the position where touch sensing electrodes and contact holes are formed. This leads to a reduction in the amount of liquid crystals filled between the first portion of the column spacer CS of the color filter array CFA and the touch sensing electrodes of the thin film transistor array TFTA. Accordingly, as large an amount of liquid crystals as the area corresponding to the first portion can be reduced, thereby decreasing the amount of change in electrostatic capacitance.

Although particular embodiments of the present invention have been illustrated and described, it will be apparent to those skilled in the art that various changes and modifications can be made without departing from the spirit of the present invention. For example, although the first exemplary embodiment and the second exemplary embodiment have been described as independent embodiments, they could be combined with each other. While, in the exemplary embodiments of the present invention, common electrodes are configured to also serve as touch driving electrodes, the present invention is not limited to these exemplary embodiments and the common electrodes may be configure to also serve as touch sensing electrodes. In this case, the touch sensing electrodes are configured as the touch driving electrodes. Accordingly, the technical scope of the present invention is not limited to the detailed description of the present invention, but should be defined by the appended claims.

What is claimed is:

1. A touch sensor integrated type display device comprising a thin film transistor array with a first substrate and a color filter array with a second substrate, the touch sensor integrated type display device comprising:
    a plurality of gate lines in parallel on the first substrate;
    a gate insulating film covering the gate lines;
    a plurality of data lines on the gate insulating film that cross over the gate lines;
    a plurality of thin film transistors in a plurality of pixel regions defined by crossings of the gate lines and the data lines, each of the plurality of thin film transistors comprising a gate electrode, a source electrode, and a drain electrode;
    a first passivation layer that covers the thin film transistors and exposes a portion of the gate insulating film;
    a plurality of first electrodes disposed directly on the gate insulating film along the data lines with the gate lines interposed therebetween, each of the plurality of first electrodes being disposed in pixel regions defined by the crossings of the gate lines and the data lines;
    a second passivation layer covering the plurality of first electrodes and the first passivation layer;
    a plurality of pixel electrodes that are respectively formed in the plurality of pixel regions on the second passivation layer and at least partially overlap the first electrodes; and
    a plurality of second electrodes in parallel to each other on the second passivation layer in parallel with the gate lines, each of the plurality of second electrodes being disposed between neighboring pixel electrodes with the gate lines interposed therebetween.

2. The touch sensor integrated type display device of claim 1, further comprising:
    a black matrix and color filters formed on the second substrate; and
    a column spacer on the black matrix, the column spacer maintaining a cell gap between the thin film transistor array and the color filter array.

3. The touch sensor integrated type display device of claim 2, wherein each of the plurality of second electrodes overlaps the black matrix and the column spacer.

4. A touch sensor integrated type display device comprising a thin film transistor array with a first substrate and a color filter array with a second substrate, the touch sensor integrated type display device comprising:
    a plurality of gate lines in parallel on the first substrate;
    a gate insulating film covering the gate lines;
    a plurality of data lines on the gate insulating film that cross over the gate lines;
    a plurality of thin film transistors in a plurality of pixel regions defined by the crossings of the gate lines and the data lines, each of the plurality of thin film transistors comprising a gate electrode, a source electrode, and a drain electrode;

a first passivation layer that covers the gate insulating film where the thin film transistors are formed;

a plurality of first electrodes on the first passivation layer in parallel with the data lines in at least two pixel regions, each of the plurality of first electrodes being disposed with the gate line interposed between the at least two pixel regions;

a second passivation layer covering the plurality of first electrodes and the first passivation lam;

a plurality of pixel electrodes in the plurality of pixel regions on the second passivation layer and at least partially overlap the first electrodes;

a plurality of second electrodes in parallel to each other on the second passivation layer, extending over the thin film transistors, and arranged in parallel with the gate lines; and a black matrix and color filters on the second substrate.

5. The touch sensor integrated type display device of claim 4, wherein the column spacer comprises:

a first portion having an area corresponding to a second electrode formation area; and a second portion partially protruding from the first portion, the second portion maintaining the cell gap between the thin film transistor array and the color filter array.

6. The touch sensor integrated type display device of claim 4, further comprising:

a black matrix and color filters formed on the second substrate; and a column spacer on the black matrix, the column spacer maintaining a cell gap between the thin film transistor array and the color filter array.

7. The touch sensor integrated type display device of claim 5, wherein the second portion of the column spacer faces portions of the first electrodes.

8. The touch sensor integrated type display device of claim 6, wherein each of the plurality of second electrodes overlaps the black matrix and the column spacer.

9. The touch sensor integrated type display device of claim 1, wherein the plurality of second electrodes are positioned at a lower position than a top surface of the first passivation layer.

10. The touch sensor integrated type display device of claim 1, wherein the plurality of first electrodes comprise common electrodes or touch sensing electrodes.

11. The touch sensor integrated type display device of claim 4, wherein the plurality of first electrodes comprise common electrodes or touch sensing electrodes.

\* \* \* \* \*